(12) United States Patent
Rachita et al.

(10) Patent No.: US 7,081,504 B2
(45) Date of Patent: Jul. 25, 2006

(54) SYNTHESIS OF 1,4-POLYBUTADIENE

(75) Inventors: Michael Joseph Rachita, North Canton, OH (US); Scott Edwards Johnson, Mogadore, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 122 days.

(21) Appl. No.: 10/929,977

(22) Filed: Aug. 30, 2004

(65) Prior Publication Data

US 2006/0047033 A1    Mar. 2, 2006

(51) Int. Cl.
C08F 2/06 (2006.01)
C08F 136/06 (2006.01)

(52) U.S. Cl. .............. 526/141; 526/137; 526/340.4; 526/907; 524/722

(58) Field of Classification Search ............ 526/137, 526/141, 907, 340.4; 524/722
See application file for complete search history.

(56) References Cited

U.S. PATENT DOCUMENTS

| | | | | |
|---|---|---|---|---|
| 2,943,112 A * | 6/1960 | Popoff et al. | ............... | 564/409 |
| 3,856,764 A | 12/1974 | Throckmorton et al. | .... | 260/821 |
| 3,910,869 A | 10/1975 | Throckmorton | ............. | 525/137 |
| 3,962,375 A | 6/1976 | Throckmorton | ............. | 526/133 |
| 4,383,097 A | 5/1983 | Castner et al. | ............... | 526/133 |
| 5,100,982 A | 3/1992 | Castner | ...................... | 526/143 |
| 5,451,646 A | 9/1995 | Castner | ...................... | 526/137 |
| 6,066,705 A * | 5/2000 | Calderon et al. | ........... | 526/141 |

FOREIGN PATENT DOCUMENTS

| | | |
|---|---|---|
| CA | 1236648 | 5/1988 |
| EP | 1116729 | 7/2001 |
| EP | 1398347 | 3/2004 |
| GB | 2186880 | 8/1987 |
| GB | 2350615 | 6/2000 |

OTHER PUBLICATIONS

Vanox(R) 12 Specification Sheet, R.T. Vanderbilt Co., Inc., dated Nov. 9, 1989.*

* cited by examiner

*Primary Examiner*—Fred Teskin
(74) *Attorney, Agent, or Firm*—Alvin T. Rockhill (57) ABSTRACT

This invention is based upon the unexpected discovery that alkylated diphenylamines can be used in conjunction with nickel based catalyst systems which contain (a) an organonickel compound, (b) an organoaluminum compound, and (c) a fluorine containing compound to produce cis-1,4-polybutadiene having reduced molecular weight and an increased level of branching. This results in the cis-1,4-polybutadiene exhibiting good processability without sacrificing cold flow characteristics. Additionally, the alkylated diphenylamine which remains in the rubber acts in a manner which provides it with antioxidant protection. In other words, the use of alkylated diphenylamines accomplishes the three major objectives that are realized by employing para-styrenated diphenylamines (reduced molecular weight, regulated polymer macrostructure through branching and antidegradant protection). However, the utilization of alkylated diphenylamines, unlike para-styrenated diphenylamines, offers the additional advantage of being soluble in aliphatic solvents. By virtue of this increased level of solubility in aliphatic solvents, such as hexane, alkylated diphenylamines can be employed at greatly reduced levels of aromatic solvents. Likewise, when mixed catalyst streams containing alkylated diphenyl amines are combined precipitation is minimized compared to para-styrenated diphenylamine significantly improving issues related to fouling. The subject invention more specifically discloses a process for producing cis-1,4-polybutadiene having a reduced molecular weight and improved processability which comprises polymerizing 1,3-butadiene in the presence of (a) an organonickel compound, (b) an organoaluminum compound, (c) a fluorine containing compound, and (d) an alkylated diphenylamine; wherein the alkylated diphenylamine has alkyl groups that contain from 2 to 18 carbon atoms, and wherein the organoaluminum compound and the fluorine containing compound are brought together in the presence of the alkylated diphenylamine.

19 Claims, 2 Drawing Sheets

SYNTHESIS OF 1,4-POLYBUTADIENE

BACKGROUND OF THE INVENTION

It is well known that cis-1,4-polybutadiene can be prepared by polymerizing 1,3-butadiene monomer with nickel based catalyst systems. Such nickel based catalyst systems contain (a) an organonickel compound, (b) an organoaluminum compound, and (c) a fluorine containing compound. Such nickel based catalyst systems and their use in the synthesis of cis-1,4-polybutadiene is described in detail in U.S. Pat. Nos. 3,856,764, 3,910,869, and 3,962,375.

The cis-1,4-polybutadiene prepared utilizing such nickel based catalyst systems typically has a high molecular weight. Due to this high molecular weight, the cis-1,4-polybutadiene is generally oil extended. However, this precludes the cis-1,4-polybutadiene from being utilized in many applications. For instance, such oil extended rubbers cannot be utilized in tire sidewalls which contain white sidewall compounds. In any case, there is a large demand for cis-1,4-polybutadiene having a reduced molecular weight which can be processed without being oil extended.

Various compounds have been found to act as molecular weight reducing agents when used in conjunction with the nickel based catalyst system. For instance, U.S. Pat. No. 4,383,097 discloses that alpha-olefins, such as ethylene and propylene, act as molecular weight reducing agents when utilized in conjunction with such three component nickel catalyst systems. Canadian Patent 1,236,648 indicates that 1-butene, isobutylene, cis-2-butene, trans-2-butene, and allene act as molecular weight regulators when used in conjunction with such nickel based catalyst systems. U.S. Pat. No. 4,383,097 reveals that certain nonconjugated diolefins, such as 1,4-pentadiene, 1,6-heptadiene, and 1,5-hexadiene, act as molecular weight reducing agents when utilized in conjunction with such catalyst systems. U.S. Pat. No. 5,100,982 indicates that cis-1,4-polybutadiene having reduced molecular weight and a broad molecular weight distribution can be synthesized with certain nickel based catalyst systems in the presence of halogenated phenols, such as para-chlorophenol.

The processability of cis-1,4-polybutadiene rubbers can be improved by simply lowering their molecular weight. However, this approach also typically leads to increased cold flow. Accordingly, the use of conventional molecular weight reducing agents, such as α-olefins, to improve rubber processability leads to compromised cold flow characteristics.

U.S. Pat. No. 5,451,646 discloses that para-styrenated diphenylamine acts as molecular weight reducing agent when employed in conjunction with nickel based catalyst systems which contain (a) an organonickel compound, (b) an organoaluminum compound, and (c) a fluorine containing compound. U.S. Pat. No. 5,451,646 indicates that para-styrenated diphenylamine also acts to improve the processability of cis-1,4-polybutadiene rubbers prepared in its presence utilizing such nickel based catalyst systems. In other words, para-styrenated diphenylamine can be employed in conjunction with such nickel based catalyst systems to reduce the molecular weight of the rubber without sacrificing cold flow characteristics. The para-alkylated diphenylamine which remains in the rubber produced also acts in a manner which provides it with antioxidant protection. The para-styrenated diphenylamine accomplishes three major objectives. It reduces the molecular weight of the polymer, regulates polymer macrostructure and acts as an anti-degradant.

U.S. Pat. No. 5,451,646 more specifically discloses a process for producing cis-1,4-polybutadiene having reduced molecular weight and improved processability which comprises polymerizing 1,3-butadiene in the presence of (a) an organonickel compound, (b) an organoaluminum compound, (c) a fluorine containing compound, and (d) para-styrenated diphenylamine; wherein the organoaluminum compound and the fluorine containing compound are brought together in the presence of the para-styrenated diphenylamine. The successful modification of catalyst activity in this case is dependent on the reaction between the para-styrenated diphenylamine and the fluorine containing compound. The complex formed when these two components come into contact is insoluble in aliphatic solvents, such as hexane. This insolubility in aliphatic solvents necessitates the use of undesired aromatic solvents in the production process to help solubilize the complex. However, even with the use of aromatic solvents the material is sensitive to precipitation and line fouling when exposed to mixed streams containing aliphatic solvents.

SUMMARY OF THE INVENTION

This invention is based upon the unexpected discovery that alkylated diphenylamines can be used in conjunction with nickel based catalyst systems which contain (a) an organonickel compound, (b) an organoaluminum compound, and (c) a fluorine containing compound to produce cis-1,4-polybutadiene having reduced molecular weight and an increased level of branching. This results in the cis-1,4-polybutadiene exhibiting good processability without sacrificing cold flow characteristics. Additionally, the alkylated diphenylamine which remains in the rubber acts in a manner which provides it with antioxidant protection. In other words, alkylated diphenylamines accomplishes the three major objectives that are realized by employing para-styrenated diphenylamines (reduced molecular weight, regulated polymer macrostructure through branching and anti-degradant protection). The utilization of alkylated diphenylamines offers the additional advantage of being soluble in aliphatic solvents. By virtue of this increased level of solubility in aliphatic solvents, such as hexane, alkylated diphenylamines can be employed at greatly reduced levels of aromatic solvents. Likewise, when mixed catalyst streams containing alkylated diphenyl amines are combined precipitation is minimized which significantly improves issues related to fouling.

The subject invention more specifically discloses a process for producing cis-1,4-polybutadiene having a reduced molecular weight and improved processability which comprises polymerizing 1,3-butadiene in the presence of (a) an organonickel compound, (b) an organoaluminum compound, (c) a fluorine containing compound, and (d) an alkylated diphenylamine; wherein the alkylated diphenylamine has alkyl groups that contain from 2 to 18 carbon atoms, and wherein the organoaluminum compound and the fluorine containing compound are brought together in the presence of the alkylated diphenylamine.

DETAILED DESCRIPTION

The polymerizations of this invention will typically be carried out as solution polymerizations in a hydrocarbon solvent which can be one or more aromatic, paraffinic, or cycloparaffinic compounds. These solvents will normally contain from 4 to about 10 carbon atoms per molecule and will be liquids under the conditions of the polymerization. Some representative examples of suitable organic solvents include isooctane, cyclohexane, normal hexane, benzene, toluene, xylene, ethylbenzene, and the like, alone or in admixture.

Para-alkylated diphenylamine will also act as molecular weight reducing agent in bulk polymerizations which are carried out with nickel based catalyst systems containing (a) an organonickel compound, (b) an organoaluminum compound, and (c) a fluorine containing compound. Such bulk polymerizations are described in detail in British Patent 2,186,880. The teachings of British Patent 2,186,880 are incorporated herein by reference in their entirety.

In the solution polymerizations of this invention, there will normally be from about 5 to about 35 weight percent monomers in the polymerization medium. Such polymerization media are, of course, comprised of the organic solvent and the 1,3-butadiene monomer. As the polymerization proceeds, monomer is converted to polymer and accordingly the polymerization medium will contain from about 5 to about 35 weight percent unreacted monomers and polymer. In most cases, it will be preferred for the polymerization medium to contain from about 10 to about 30 weight percent monomers and polymers. It is generally more preferred for the polymerization medium to contain from 20 to 25 weight percent monomers and polymers.

Polymerization is typically started by adding the nickel based catalyst system and the alkylated diphenylamine to the polymerization medium. However, it is critical for the organoaluminum compound and the fluorine containing compound to be brought together in the presence of the alkylated diphenylamine. The organonickel compound can be brought into contact with the alkylated diphenylamine either before or after it is brought into contact with the fluorine containing compound.

In batch techniques, it is normally convenient to add the catalyst components and the alkylated diphenylamine to a polymerization medium which already contains 1,3-butadiene monomer in an organic solvent. This is preferably done by sequentially adding (1) the organoaluminum compound, (2) the alkylated diphenylamine, (3) the organonickel compound and (4) the fluorine containing compound to the polymerization medium. Another preferred batch technique involves the sequential addition of (1) the organoaluminum compound, (2) the organonickel compound, (3) the alkylated diphenylamine and (4) the fluorine containing compound to the polymerization medium. Also, the alkylated diphenylamine can be prereacted with the fluorine containing compound with the resultant product being added to the polymerization medium.

The alkylated diphenylamine that can be utilized in the practice of this invention can have alkyl groups in the ortho, meta, or para positions on the phenyl groups. The alkyl groups will typically contain from 2 to 18 carbon atoms and will preferably contain from 4 to 12 carbon atoms. The alkylated diphenylamine used in the practice of this invention will typically be alkylated in the para position and will accordingly be of the structural formula:

wherein R represents alkyl groups which can be the same or different and which contain from 2 to 18 carbon atoms. Mixtures of various alkylated diphenylamines which are substituted in the ortho, meta, and/or para positions can be used in the practice of this invention.

The organoaluminum compounds that can be utilized in the practice of this invention are of the structural formula:

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups, and arylalkyl groups. It is preferred for $R_1$, $R_2$ and $R_3$ to represent alkyl groups which contain from 1 to about 10 carbon atoms. It is more preferred for $R_1$, $R_2$ and $R_3$ to represent alkyl groups which contain from two to five carbon atoms.

Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, diisobutyl aluminum hydride (DIBA-H), and diethyl aluminum fluoride.

The component of the catalyst which contains nickel can be any soluble organonickel compound. These soluble nickel compounds are normally compounds of nickel with a mono-dentate or bi-dentate organic ligands containing up to 20 carbon atoms. A ligand is an ion or molecule bound to and considered bonded to a metal atom or ion. Mono-dentate means having one position through which covalent or coordinate bonds with the metal may be formed. Bi-dentate means having two positions through which covalent or coordinate bonds with the metal may be formed. The term "soluble" refers to solubility in butadiene monomer and inert solvents.

Generally, any nickel salt or nickel containing organic acid containing from about 1 to 20 carbon atoms may be employed as the soluble nickel containing compound. Some representative examples of soluble nickel containing compounds include nickel benzoate, nickel acetate, nickel naphthenate, nickel octanoate, nickel neodecanoate, bis(c-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis(π-allyl nickel), bis(π cycloocta-1,5-diene), bis(π-allyl nickel trifluoroacetate), and nickel tetracarbonyl. The preferred component containing nickel is a nickel salt of a carboxylic acid or an organic complex compound of nickel. Nickel naphthenate, nickel octanoate, and nickel neodecanoate are highly preferred soluble nickel containing compounds. Nickel 2-ethylhexanoate, which is commonly referred to as nickel octanoate (NiOct) is the soluble nickel containing compound which is most commonly used due to economic factors.

The fluorine containing compound utilized in the catalyst system is generally hydrogen fluoride or boron trifluoride. If hydrogen fluoride is utilized, it can be in the gaseous or liquid state. It, of course, should be anhydrous and as pure as possible. The hydrogen fluoride can be dissolved in an inert solvent; and thus, can be handled and charged into the reaction zone as a liquid solution. Optionally, butadiene monomer can be utilized as the solvent. Inert solvents include alkyl-, alkaryl-, arylalkyl-, and aryl-hydrocarbons. For example, benzene and toluene are convenient solvents.

The boron trifluoride component of the catalyst can be gaseous boron trifluoride. It should also be anhydrous and as pure as possible.

The hydrogen fluoride and/or boron trifluoride can also be utilized as complexes in the catalyst system as the fluorine containing compound. Hydrogen fluoride complexes and boron trifluoride complexes can readily be made with compounds which contain an atom or radical which is capable of lending electrons to or sharing electrons with hydrogen fluoride or boron trifluoride. Compounds capable of such associating are ethers, alcohols, ketones, esters, nitrites, amines, and water.

The ketone subclass can be defined by the formula:

wherein R' and R are selected from the group consisting of alkyl radicals, cycloalkyl radicals, aryl radicals, alkaryl radicals, and arylalkyl radicals containing from 1 to about 30 carbon atoms; and wherein R' and R can be the same or different. These ketones represent a class of compounds which have a carbon atom attached by a double bond to oxygen. Some representative examples of ketones that are useful in the preparation of the ketone-hydrogen fluoride complexes or boron trifluoride complexes of this invention include dimethyl ketone, methylethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones that can be used to form the ketone-hydrogen fluoride compounds and the ketone-boron trifluoride compounds of this invention are the dialkyl ketones of which acetone is most preferred.

The nitrile subclass can be represented by the formula RCN where R represents alkyl groups, cycloalkyl groups, aryl groups, alkaryl groups or arylalkyl groups that contain up to about 30 carbon atoms. The nitrites contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoride-nitrile complex or boron trifluoride nitrile complex is the hydrogen fluoride benzonitrile complex or the boron trifluoride benzonitrile complex.

The alcohol subclass can be defined by the formula ROH where R represents alkyl radicals, cycloalkyl radicals, aryl radicals, alkaryl radicals, or arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of hydrogen fluoride complexes and boron trifluoride complexes are methanol, ethanol, n-propanol, isopropanol, phenol, benzyl alcohol, cyclohexanol, butanol, hexanol and pentanol. The preferred hydrogen fluoride-alcohol complex or boron trifluoride alcohol complex is hydrogen fluoride phenolate complex or boron trifluoride phenolate complex.

The ether subclass can be defined by the formula R'OR where R and R' represent alkyl radicals, cycloalkyl radicals, aryl radicals, alkaryl radicals, and arylalkyl radicals containing from about 1 to about 30 carbon atoms; wherein R and R' may be the same or dissimilar. The R may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes or boron trifluoride complexes of this invention are dimethyl ether, diethyl ether, dibutyl ether, diamyl ether, diisopropyl ethers, tetrahydrofuran, anisole, diphenyl ether, ethyl methyl ether, dibenzyl ether and the like. The preferred hydrogen fluoride-ether complexes or boron trifluoride-ether complexes are hydrogen fluoride diethyl etherate, hydrogen fluoride dibutyl etherate, boron trifluoride diethyl etherate, boron trifluoride dibutyl etherate complexes.

The ester subclass can be defined by the formula:

wherein R and R' are selected from the group consisting of alkyl radicals, cycloalkyl radicals, aryl radicals, alkaryl radicals and arylalkyl radicals containing from 1 to about 20 carbon atoms. The esters contain a carbon atom attached by a double bond to an oxygen atom as indicated. Representative but not exhaustive of such esters are ethyl benzoate, amyl benzoate, phenyl acetate, phenyl benzoate and other esters conforming to the formula above. The preferred hydrogen fluoride-ester complex is hydrogen fluoride ethyl benzoate complex. The preferred boron trifluoride-ester complex is boron trifluoride ethyl benzoate complex.

The hydrogen fluoride can also be utilized as a complex with the alkylated diphenylamine. In this case, the alkylated diphenylamine and hydrogen fluoride form a salt which is not only soluble in aromatic solvents, such as toluene but also soluble in aliphatic solvents such as hexane. When added to the polymerization system, the salt reacts with the organoaluminum compound to form alkylaluminum fluorides.

Such complexes are usually prepared by simply bubbling gaseous boron trifluoride or hydrogen fluoride into appropriate amounts of the complexing agent, for instance, a ketone, an ether, an ester, an alcohol, or a nitrile. This should be done in the absence of moisture, and measures should be taken to keep the temperature from rising above about 100° F. (37.7° C.). In most cases, boron trifluoride and hydrogen fluoride complexes are prepared with the temperature being maintained at room temperature. Another possible method would be to dissolve the hydrogen fluoride or the complexing agent in a suitable solvent followed by adding the other component. Still another method of mixing would be to dissolve the complexing agent in a solvent and simply bubble gaseous hydrogen fluoride or boron trifluoride through the system until all of the complexing agent is reacted with the hydrogen fluoride or boron trifluoride. The concentrations can be determined by weight gain or chemical titration.

The four component catalyst system utilized can be preformed. If the catalyst system is preformed, it will maintain a high level of activity over a long period of time. The utilization of such a preformed catalyst system also results in the formation of a uniform polymeric product. Such preformed catalyst systems are prepared in the presence of one or more preforming agents selected from the group consisting of monoolefins, nonconjugated diolefins, conjugated diolefins, cyclic nonconjugated multiolefins, acetylenic hydrocarbons, triolefins, vinyl ethers and aromatic nitriles.

Some representative examples of olefins that can be used as the preforming agent in the preparation of stabilized catalysts are trans-2-butene, mixed cis and trans-2-pentene, and cis-2-pentene. Some nonconjugated diolefins that can be used as preforming agents are cis-1,4-hexadiene, 1,5-heptadiene, 1,7-octadiene, and the like. Representative examples of cyclic nonconjugated multiolefins that can be used include 1,5-cyclooctadiene, 1,5,9-cyclododecatriene, and 4-vinyl cyclohexene-1. Some representative examples of acetylenic hydrocarbons which can be used as the preforming agent are methyl acetylene, ethyl acetylene, 2-butyne, 1-pentyne, 2-pentyne, 1-octyne, and phenyl acetylene. Triolefins that can be used as the preforming agent include 1,3,5-hexatriene, 1,3,5-heptatriene, 1,3,6-octatriene, 5-methyl-1,3,6-heptatriene and the like. Some representative examples of substituted conjugated diolefins that can be used include 1,4-diphenyl butadiene, myrcene (7-methyl-3-methylene-1,6octadiene), and the like. Ethyl vinyl ether and isobutyl vinyl ether are representative examples of alkyl vinyl ethers that can be used as the preforming agent. A representative example of an aromatic nitrile that can be used is benzonitrile. Some representative examples of conjugated diolefins that can be used include 1,3-butadiene, isoprene, and 1,3-pentadiene. The preferred preforming agent is 1,3-butadiene.

A method of preparing the preformed catalyst so that it will be highly active and relatively chemically stable is to add the organoaluminum compound and the preforming agent to the solvent medium before they come into contact with the nickel compound and the alkylated diphenylamine. The nickel compound and the alkylated diphenylamine are then added to the solution with the fluoride compound being added to the solution subsequently. As an alternative, the preforming agent and the nickel compound may be mixed, followed by the addition of the organoaluminum compound, the alkylated diphenylamine and then the fluoride compound or the hydrogen fluoride/alkylated diphenylamine complex. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

These preformed catalysts have catalytic activity immediately after being prepared. However, it has been observed that a short aging period, for example 15 to 30 minutes, at a moderate temperature, for example 50° C., increases the activity of the preformed catalyst greatly.

In order to properly stabilize the catalyst, the preforming agent must be present before the organoaluminum compound has an opportunity to react with either the nickel compound or the fluoride compound. If the catalyst system is preformed without the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

The four component nickel catalyst system can also be premixed. Such premixed catalyst systems are prepared in the presence of one or more polymeric catalyst stabilizers. The polymeric catalyst stabilizer can be in the form of a liquid polymer, a polymer cement, or a polymer solution. Polymeric catalyst stabilizers are generally homopolymers of conjugated dienes or copolymers of conjugated dienes with styrenes and methyl substituted styrenes. The diene monomers used in the preparation of polymeric catalyst stabilizers normally contain from 4 to about 12 carbon atoms. Some representative examples of conjugated diene monomers that can be utilized in making such polymeric catalyst stabilizers include isoprene, 1,3-butadiene, piperylene, 1,3-hexadiene, 1,3-heptadiene, 1,3-octadiene, 2,4-hexadiene, 2,4-heptadiene, 2,4-octadiene and 1,3-nonadiene. Also included are 2,3-dimethylbutadiene, 2,3-dimethyl-1,3-hexadiene, 2,3-dimethyl-1,3-heptadiene, 2,3-dimethyl-1,3-octadiene and 2,3-dimethyl-1,3-nonadiene and mixtures thereof.

Some representative examples of polymeric catalyst stabilizers include polyisoprene, polybutadiene, polypiperylene, copolymers of butadiene and styrene, copolymers of butadiene and α-methylstyrene, copolymers of isoprene and styrene, copolymers of isoprene and α-methylstyrene, copolymers of piperylene and styrene, copolymers of piperylene and α-methylstyrene, copolymers of 2,3-dimethyl-1,3-butadiene and styrene, copolymers of 2,3-dimethyl butadiene and α-methylstyrene, copolymers of butadiene and vinyltoluene, copolymers of 2,3-dimethyl-1,3-butadiene and vinyltoluene, copolymers of butadiene and β-methylstyrene, and copolymers of piperylene and β-methylstyrene.

In order to properly stabilize the catalyst system by this premixing technique, the polymeric catalyst stabilizer must be present before the organoaluminum compound has an opportunity to react with either the nickel compound or the fluorine containing compound. The alkylated diphenylamine will, of course, be present when the organoaluminum compound is brought into contact with the fluorine containing compound. If the catalyst system is premixed without the presence of at least a small amount of polymeric catalyst stabilizer, the chemical effect of the organoaluminum compound upon the nickel compound or the fluoride compound is such that the catalytic activity of the catalyst system is greatly lessened and shortly thereafter rendered inactive. In the presence of at least a small amount of polymeric catalyst stabilizer, the catalytic or shelf life of the catalyst system is greatly improved over the same system without any polymeric catalyst stabilizer present.

One method of preparing this premixed catalyst system so that it will be highly active and relatively chemically stable is to add the organoaluminum compound to the polymer cement solution and mix thoroughly before the organoaluminum compound comes into contact with the nickel containing compound. The nickel compound is then added to the polymer cement solution. Alternatively, the nickel compound can be mixed with the polymer cement first, followed by the addition of the organoaluminum compound and the alkylated diphenylamine. Then the fluorine containing compound is added to the polymer cement solution. This is not intended to preclude other orders or methods of catalyst addition, but it is emphasized that the polymer stabilizer must be present before the organoaluminum compound has a chance to react with either the nickel containing compound or the fluorine containing compound.

The amount of polymeric catalyst stabilizer used to premix the catalyst system can be within the range of about 0.01 to 3 weight percent of the total amount monomer to be polymerized. Expressed as a weight ratio of polymeric catalyst stabilizer to nickel, the amount of polymeric catalyst stabilizer present during the premixing step can be within the range of about 2 to 2000 times the concentration of nickel. The preferred weight ratio of polymeric catalyst stabilizer to nickel is from about 4:1 to about 300:1. Even though such premixed catalyst systems show catalytic activity immediately after being prepared, it has been observed that a short aging period, for example 15 to 30 minutes, at moderate temperatures, for example 50° C., increases the activity of the preformed catalyst system.

A "modified in situ" technique can also be used in making the four component nickel catalyst system. In fact, the utilization of catalysts made by such "modified in situ" techniques results in more uniform control of the polymerization and the polymeric product. In such a "modified in situ" technique, the organoaluminum compound is added to neat 1,3-butadiene monomer with the nickel containing compound and the alkylated diphenylamine being added later. The butadiene monomer containing the organoaluminum compound, the alkylated diphenylamine and the nickel containing compound is then charged into the reaction zone being used for the polymerization with the fluorine containing compound being charged into the reaction zone separately. Normally, the organoaluminum compound, the alkylated diphenylamine and the nickel containing compound are charged into the reaction zone soon after being mixed into the butadiene monomer. In most cases, the organoaluminum compound, the alkylated diphenylamine and the nickel containing compound are charged into the reaction zone within 60 seconds after being mixed in the butadiene monomer. It will generally be desirable to utilize organoaluminum compounds and nickel containing compounds which have been dissolved in a suitable solvent.

The traditional three component nickel catalyst systems utilized in the practice of the present invention have activity over a wide range of catalyst concentrations and catalyst component ratios. The three catalyst components interact to form the active catalyst system. As a result, the optimum concentration for any one component is very dependent upon the concentrations of each of the other two catalyst components. Furthermore, while polymerization will occur over a wide range of catalyst concentrations and ratios, the most desirable properties for the polymer being synthesized are obtained over a relatively narrow range. Polymerizations can be carried out utilizing a mole ratio of the organoaluminum compound to the nickel containing compound within the range of from about 0.3:1 to about 300:1; with the mole ratio of the fluorine containing compound to the organonickel containing compound ranging from about 0.5:1 to about 200:1 and with the mole ratio of the fluorine containing compound to the organoaluminum compound ranges from about 0.4:1 to about 10:1. The preferred mole ratios of the organoaluminum compound to the nickel containing compound ranges from about 1 to about 100:1, and the preferred mole ratio of the fluorine containing compound to the organoaluminum compound ranges from about 0.7:1 to about 7:1. The concentration of the catalyst system utilized in the reaction zone depends upon factors such as purity, the reaction rate desired, the polymerization temperature utilized, the reactor design and other factors.

In order to facilitate charging the catalyst components into the reaction zone "in situ" they can be dissolved in a small amount of an inert organic solvent or butadiene monomer. Preformed and premixed catalyst systems will, of course, already be dissolved in a solvent.

The amount of alkylated diphenylamine that needs to be employed as a molecular weight reducing agent varies with the catalyst system, with the polymerization temperature, and with the desired molecular weight of the high cis-1,4-polybutadiene rubber being synthesized. For instance, if a high molecular weight rubber is desired, then a relatively small amount of alkylated diphenylamine is required. On the other hand, in order to reduce molecular weights substantially, a relatively large amount of the alkylated diphenylamine will need to be employed. Generally, greater amounts of the alkylated diphenylamine are required when the catalyst system being utilized contains hydrogen fluoride or is an aged catalyst which contains boron trifluoride. However, as a general rule, from about 0.25 phm (parts by weight per hundred parts of monomer) to about 1.5 phm of the alkylated diphenylamine will be employed.

It is normally preferred to utilize 0.5 phm to 0.75 phm of the alkylated diphenylamine because at such concentrations good reductions in molecular weight can be realized. In such cases, the molecular weight of the rubber being synthesized can be controlled by adjusting the ratio of the fluorine containing compound to the organoaluminum compound. In other words, at constant levels of the alkylated diphenylamine within the range of 0.25 phm to 1.5 phm, the molecular weight of the polymer being synthesized can be controlled by varying the ratio of the fluorine containing compound to the organoaluminum compound. Maximum reductions in molecular weight and maximum conversions normally occur at molar ratios of the fluorine containing compound to the organoaluminum compound which are within the range of 1.5:1 to 2:1. At molar ratios of less than 1.5:1 and at molar ratios within the range of 2:1 to 2.75:1, lesser reductions in molecular weight occur.

The temperatures utilized in the polymerizations of this invention are not critical and may vary from extremely low temperatures to very high temperatures. For instance, such polymerizations can be conducted at any temperature within the range of about −10° C. to about 120° C. The polymerizations of this invention will preferably be conducted at a temperature within the range of 30° C. to 110° C. It is normally preferred for the polymerization to be carried out at a temperature which is within the range of about 70° C. to about 95° C. Such polymerizations will normally be conducted for a period of time which is sufficient to attain a high yield which is normally in excess of about 80% and preferably in excess of about 90%.

The cis-1,4-polybutadiene rubber made utilizing the techniques of this invention typically has a cis content in excess of about 95%. For example, the cis-1,4-polybutadiene rubber made utilizing the techniques of this invention will typically have a cis content of about 97%, a trans content of about 2%, and a vinyl content of about 1%.

After the polymerization is completed, the cis-1,4-polybutadiene rubber may be recovered from the resulting polymer solution (rubber cement) by any of several procedures. One such procedure comprises mixing the rubber cement with a polar coagulating agent, such as methanol, ethanol, isopropylalcohol, acetone, or the like. The coagulating agent can be added at room temperature or below whereupon the liquified low molecular weight hydrocarbons will vaporize. If desired, gentle heat may be applied to hasten the removal of low molecular weight hydrocarbons, but not sufficient heat to vaporize the polar coagulating agent. The vaporized low molecular weight hydrocarbon solvents can then be recovered and recycled. The coagulated rubber is recovered from the slurry of the polar coagulating agent by centrifugation, decantation or filtration.

Another procedure for recovering the cis-1,4-polybutadiene rubber is by subjecting the rubber solution to spray drying. Such a procedure is particularly suitable for continuous operations and has the advantage that heat requirements are at a minimum. When such a procedure is used, the recovered polymer should be washed soon after recovery with a polar solvent in order to destroy the remaining active catalyst contained in the polymer. In such procedures the vaporized organic solvents are also easily recovered, but will normally require purification before being recycled.

The practice of this invention is further illustrated by the following examples which are intended to be representative rather than restrictive of the scope of the subject invention.

EXAMPLES 1–5

The following examples serve to demonstrate the unexpected finding that alkylated diphenylamines are as effective as para-styrenated diphenylamines at regulating molecular weight and polymer macrostructure in the polymerization of 1,3-butadiene with a nickel based catalyst system.

Materials—Butadiene was supplied by The Goodyear Tire & Rubber Company, and was freshly distilled prior to use. Hexane was supplied from Ashland Chemicals and purified by passing over an activated bed of silica gel under a dry nitrogen atmosphere. Nickel octanoate was provided by Shepherd as a 58 weight percent solution in mineral oil which was diluted to 0.01M in hexane prior to use. Triisobutylaluminum (TIBA) was supplied by Albemarle Corp. as a 25 weight percent solution in hexane and used as received. Hydrogen fluoride (HF) was supplied as a 25 wt % solution in butylether. HF was handled in Teflon bottles using neoprene gloves. Dilution to approximately 1 M in hexane was accomplished wearing neoprene gloves followed by titration with 0.101 N sodium hydroxide standard using phenolphthalein as an indicator. Styrenated and alkylated diphenylamine (SDPA) modifiers were used as 0.25M solutions in toluene.

Polymerizations—Small scale batch polymerizations were carried out in oven dried glass bottles sealed with perforated metal screw caps containing a rubber gasket and a Teflon liner. Premix (12 to 18 weight percent butadiene in hexane) was charged into each bottle after it was first passed through a bed of silica gel under a nitrogen atmosphere. Catalyst components were introduced via common syringe techniques and polymerizations were conducted in a Parameter Generation & Control Inc. (PGC) constant temperature water bath at 65° C. equipped with an adjustable speed motorized tumbler. Polymerizations were terminated by treating the live polymer cement with an isopropanol/antioxidant solution. Polymer was recovered by pouring the polymer cement into pans and drying in vacuo at 60° C. Conversion data was determined gravimetrically.

Characterization—Size-exclusion chromatography (SEC) was performed using a Wyatt Technologies miniDawn light scattering detector coupled with a Hewlett Packard 1047A refractive index detector. Two Polymer Laboratories C microgel columns in series were utilized with tetrahydrofuran as the carrier solvent at a flow rate of 0.7 ml/min and a column temperature of 40° C. Sample preparation involved filtering a 0.12 wt % solution of polymer in THF through a 1.0 μm filter prior to injection. Polystyrene standards were used to calibrate the instrument.

Qualitative Brookfield viscosity of 15 weight percent polymer/hexane cements was measured on a Brookfield DV-E Viscometer equipped with HA/HB spindle 6 at room temperature. Quantitative values were determined on 10 weight percent solutions in toluene utilizing spindle 3.

Experimental Results—In this series of experiments the compounds identified in Table 1 were studied as molecular weight regulators for use in conjunction with nickel based catalyst systems for the polymerization of 1,3-butadiene monomer into cis-1,4-polybutadiene. Three of the materials, Additin RC 7135, Naugalube 635 and Wingstay® 29 are all styrenated diphenylamines. The fourth material, Good-Rite® 3190 is an alkylated diphenylamine (octylated with 2,4,4-trimethylstyrene).

To evaluate the effectiveness of the four compounds at regulating molecular weight and branching in the polymerization of 1,3-butadiene monomer into cis-1,4-polybutadiene with a nickel based catalyst system, a series of polymerizations were conducted in 4 oz (118 ml) polymerization bottles. The series of bottles were charged sequentially with solutions of triisobutyl aluminum (40 eq), nickel octanoate (1 eq), amine (40 eq), and finally HF (80 eq) at a Ni charge level of 0.015 phr. The polymerizations were conducted at 65° C. for 90 minutes reaching full conversion. As entry 1 in Table 1 shows, a control bottle was also run without any amine modifier. In this control polymerization, a milky white polymer cement was generated yielding a very viscous solution as measured by Brookfield viscosity (180,000 cP) and high molecular weight. When Wingstay® 29 styrenated amine was added to the catalyst recipe however, as in entry 2, a homogenous polymer cement results coupled with a significant reduction in cement viscosity (12,400 cP) and molecular weight. Such a finding is consistent with the prior art's teaching that the use of styrenated diphenylamines will lower the molecular weight and increase branching compared to the control Ni/HF system. Surprisingly however, the Good-Rite® 3190 alkylated diphenylamine also provided clear cements, reduced viscosities, and molecular weight profiles very similar to that of the styrenated controls.

TABLE 1

Comparison of the diphenylamine compounds in Ni/HF polymerizations

| Entry | Amine | Cement Appearance | Brookfield Viscosity (cP) | Mn (K) | Mw (K) | Mz (K) |
|---|---|---|---|---|---|---|
| 1 | none | milky | 180,000 | 242 | 702 | 1771 |
| 2 | WS29 | clear | 12,400 | 184 | 512 | 1258 |
| 3 | Good-Rite | clear | 25,700 | 204 | 542 | 1320 |
| 4 | Additin | clear | 16,400 | 205 | 556 | 1401 |
| 5 | Neaugalube | slight haze | 45,900 | 283 | 731 | 1668 |

EXAMPLES 6–9

The following examples serve to demonstrate the unexpected finding that alkylated diphenylamines act as a general class of compounds effective at regulating molecular weight and polymer macrostructure in the polymerization of 1,3-butadiene with a nickel based catalyst system.

Evaluation of the effectiveness of other alkylated diphenylamines at regulating molecular weight was accomplished by comparing the Irganox-5057® alkylated diphenylamine to both Good-Rite® alkylated diphenyl amine and Wingstay® 29 styrenated amine. As shown in table 2, following the polymerization procedure in the previous examples, but at slightly higher total catalyst levels, both alkylated diphenylamines were effective at reducing molecular weight compared to the controls.

TABLE 2

Comparison of the other alkylated diphenylamines

| Entry | Amine | Amine Type | Cement Appearance | Brookfield Viscosity (cP) |
|---|---|---|---|---|
| 6 | none | none | milky | 30,200 |
| 7 | WS29 | styrenated | clear | 8,470 |
| 8 | Good-Rite | alkylated | clear | 11,600 |
| 9 | Irg-5057 | alkylated | clear | 9,400 |

EXAMPLES 10–22

To gain a better understanding of the sensitivity of viscosity reduction on the level of amine modifier present, a series of bottle polymerizations were conducted that varied in the amount of amine used from 30 equivalents to 50 equivalents. Polymerizations were again carried out at 65° C. for 90 minutes with a Ni charge of 0.014 phr and a TIBA:Ni:amine:HF ratio of 40:1:30–50:80. All polymerizations went to full conversion. Again, as evident in Table 3, the alkylated diphenylamine modifier was as effective as the styrenated diphenylamines. For example, in all cases, 30 eq of amine was not enough to provide full reduction of cement viscosity. By 40 equivalents, however, all four amines provided very similar viscosities versus the unmodified control.

TABLE 3

Molecular weight as a function of amine levels.

| Entry | Amine | Equiv. | Brookfield Viscosity (cp) | Mn (K) | Mw (K) | Mz (K) |
|---|---|---|---|---|---|---|
| 10 | WS29 | 30 | 36,330 | | | |
| 11 | WS29 | 40 | 24,070 | | | |
| 12 | WS29 | 50 | 27,930 | | | |
| 13 | Good-Rite | 30 | 31,200 | 237 | 648 | 1,508 |
| 14 | Good-Rite | 40 | 21,470 | 207 | 562 | 1,314 |
| 15 | Good-Rite | 50 | 19,730 | 177 | 526 | 1,225 |
| 16 | Additin | 30 | 22,470 | 207 | 590 | 1,411 |
| 17 | Additin | 40 | 17,070 | 182 | 520 | 1,302 |
| 18 | Additin | 50 | 13,400 | 159 | 488 | 1,206 |
| 19 | Neaugalube | 30 | 30,270 | | | |
| 20 | Neaugalube | 40 | 17,600 | | | |
| 21 | Neaugalube | 50 | 18,300 | | | |
| 22 | none | 0 | 93,000 | | | |

EXAMPLE 23–38

EXAMPLES 23–38

This example serves to demonstrate the unexpected hexane solubility of alkylated diphenylamine/HF adducts and the significant process improvements that result related to the reduction of aromatic solvents and fouling concerns.

As previous examples demonstrate, alkylated diphenyl amines (ADPA) serve as functional equivalents to styrenated diphenyl amines (SDPA) in the polymerization of 1,3-butadiene with a nickel based catalyst system. What is different about these two classes of amines, however, is the significantly increased hexane solubility of ADPA/HF complexes compared to SDPA/HF adducts. For example, as shown in Table 4, (entry 23), when a 50/50 weight ratio of Wingstay® 29 styrenated amine/hexane solution is treated with 2 equivalents of HF an insoluble precipitate is formed. The alkylated amines in stark contrast have been surprisingly found to form completely hexane soluble HF/amine adducts (entries 24–29). The aliphatic insolubility of the SDPA/HF adduct necessitates the use of undesired aromatic solvents in the production process. For example, in entry 30 a 50/50 mixture of Wingstay® 29 styrenated amine (WS29) and ethylbenzene (EB) that has been treated with 2 molar equivalents of HF is completely homogeneous. The reaction product in this case is soluble due to the presence of the aromatic solvent. Unfortunately, even with the use of aromatic solvents, the SDPA/HF complex is sensitive to precipitation and fouling when exposed to pre-catalyst streams that contain aliphatic solvents. As shown in entry 30, when the 50/50 ethylbenzene based SDPA/HF solution is exposed to a second pre-catalyst stream, containing nickel and TIBA diluted with hexane, initially a precipitate forms. Eventually a stable homogenous preformed catalyst solution remains. However, if the amount of EB is reduced (which is desired due to cost and environmental issues) by changing the weight ratio of WS29/EB to 67/33 or 80/20 an insoluble preformed catalyst solution will result as in entries 31 and 32. At a ratio of 80/20 very heavy clumping of the precipitate on the walls of the catalyst make-up reactor is observed. However, by repeating this series of experiments with the alkylated diphenyl amine it is apparent that the preformed catalyst solutions are completely soluble at all ratios of EB used (entries 33–38). Even at the extreme case of 80/20 there was no evidence of precipitation in any of the catalyst make-up steps. Significant reduction in EB usage is therefore realized by switching to an alkylated diphenyl amine. An even more dramatic set of experiments (entry 24–29) showed that the alkylated diphenylamines/HF adducts soluble in hexane remained soluble when exposed to the hexane based pre-catalyst streams. All three hexane weight ratios gave completely soluble and stable preformed catalyst solutions in the absence of aromatic solvents.

TABLE 4

Solubility differences for styrenated and alkylated diphenylamine/HF adducts.

| Entry | Amine | Type | Solvent | Weight Ratio (amine/ solvent) | Mole Ratio (HF/ amine) | Amine/HF solution appearance | Add Amine/HF solution to Nickel/TIBA hexane based preform solution |
|---|---|---|---|---|---|---|---|
| 23 | WS29 | styrenated | hexane | 50/50 | 2 | insoluble mass | NA |
| 24 | Good-Rite | alkylated | hexane | 50/50 | 2 | homogeneous | homogeneous solution |
| 25 | Good-Rite | alkylated | hexane | 67/33 | 2 | homogeneous | homogeneous solution |
| 26 | Good-Rite | alkylated | hexane | 80/20 | 2 | homogeneous | homogeneous solution |
| 27 | I-5057 | alkylated | hexane | 50/50 | 2 | homogeneous | homogeneous solution |
| 28 | I-5057 | alkylated | hexane | 67/33 | 2 | homogeneous | homogeneous solution |
| 29 | I-5057 | alkylated | hexane | 80/20 | 2 | homogeneous | homogeneous solution |
| 30 | WS29 | styrenated | ethylbenzene | 50/50 | 2 | homogeneous | initial precipitate that completely dissolves |
| 31 | WS29 | styrenated | ethylbenzene | 67/33 | 2 | homogeneous | insoluble precipitate builds up on walls |
| 32 | WS29 | styrenated | ethylbenzene | 80/20 | 2 | homogeneous | heavy clumping of precipitate on walls |
| 33 | Good-Rite | alkylated | ethylbenzene | 50/50 | 2 | homogeneous | homogeneous solution |
| 34 | Good-Rite | alkylated | ethylbenzene | 67/33 | 2 | homogeneous | homogeneous solution |
| 35 | Good-Rite | alkylated | ethylbenzene | 80/20 | 2 | homogeneous | homogeneous solution |
| 36 | I-5057 | alkylated | ethylbenzene | 50/50 | 2 | homogeneous | homogeneous solution |
| 37 | I-5057 | alkylated | ethylbenzene | 67/33 | 2 | homogeneous | homogeneous solution |
| 38 | I-5057 | alkylated | ethylbenzene | 80/20 | 2 | homogeneous | homogeneous solution |

EXAMPLES 39–41

The following examples serve to demonstrate the unexpected finding that alkylated diphenylamines are as effective as para-styrenated diphenylamines at regulating molecular weight and polymer macrostructure in the continuous polymerization of 1,3-butadiene with a nickel based catalyst system.

To model the polymerization conditions experienced in a continuous production scheme a series of continuous polymerizations were performed. The runs were designed to initially establish the prior art utilizing Wingstay® 29 styrenated amine as the molecular weight/macrostructure control agent. Then an alkylated diphenyl amine would be used to produce polymer for comparison under the control conditions The polymerizations were conducted on a continuous reactor chain configured with three 2 gallon (7.57 liter) reactors in series. Polymerization was carried out in the first two reactors and the third reactor was used to terminate the polymerization. The primary premix used consisted of 50% 1,3-butadiene in hexane, was re-circulated through premix tank columns, and then passed over a large feed column before polymerization. An additional hexane stream was fed over a large feed column and the flow was controlled to maintain the desired monomer concentration to the chain.

The catalyst stream was fed into the first reactor along with 1,3-butadiene monomer as described above. The total catalyst level as well as individual component ratios can be adjusted as necessary to achieve the desired process control. After the appropriate resonance time in the first and second reactors, polymerization is terminated in the third reactor with a rosin acid shortstop (1.0 phr) and Wingstay® K antioxidant (0.15 phr) as a stabilizer.

Figure 1:
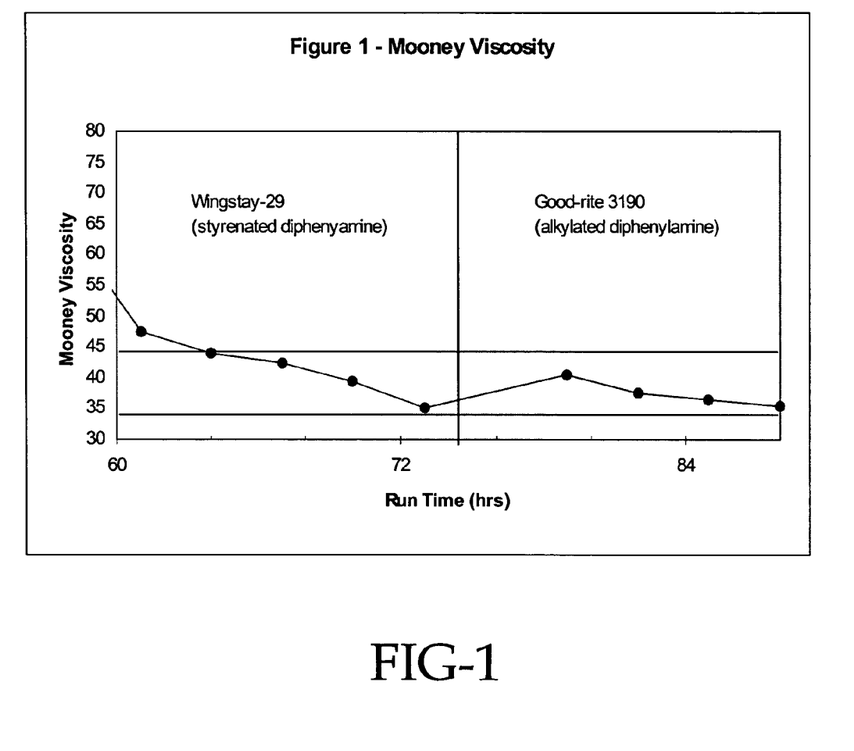
FIG. 1 shows the Mooney viscosity of the polybutadiene produced by the continuous polymerization described in Examples 39–41 as a function of run time.
Figure 2:
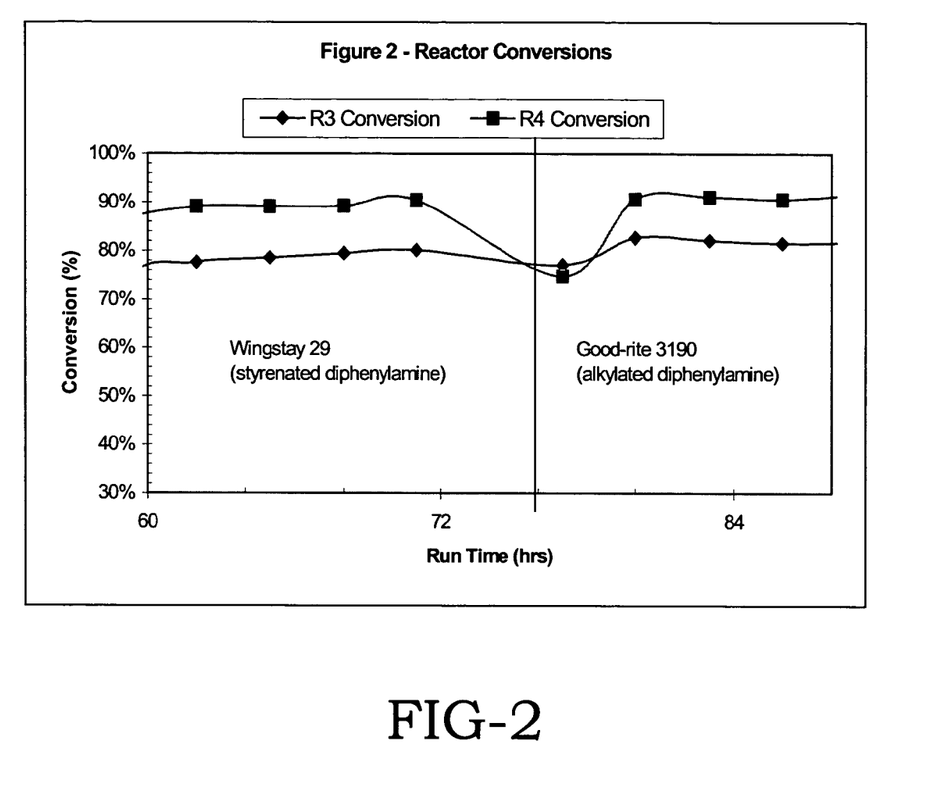
FIG. 2 shows the conversion attained in the continuous polymerization described in Examples 39–41 as a function of run time.

In the first experiment starting with Wingstay® 29 styrenated amine as the catalyst modifier flows were initiated and polymerization was observed within 2 hours after startup. The chain was allowed sufficient time to line out after which several process changes were made in order to produce the desired cis-1,4-polybutadiene rubber having the desired Mooney viscosity and level of branching. Under these conditions, as shown in FIG. 1, the polybutadiene produced with Wingstay® 29 styrenated amine had a Mooney viscosity between 35 and 45 for the run time 60 to 74 hours. Conversion during this time period, shown in FIG. 2, remained very constant at 78% in the first reactor and 90% in the second reactor.

With the chain at steady state, the amine modifier was changed from Wingstay® 29 styrenated amine to Noveon's Good-Rite® 3190 NT alkylated diphenylamine. As is evident from FIGS. 1 and 2, except for an initial drop in reactor conversion at run time 74 hours due to the disruption of the chain during change over, the effect the alkylated diphenylamine had on Mooney viscosity and conversion was transparent. There was no indication that the alkylated diphenylamine based polymerization was any different than the styrenated diphenylamine process.

A number of samples were finished from the above run and characterized as shown in Table 5. At equal Mooney viscosities there was very little difference between the Wingstay® 29 styrenated amine based sample and the alkylated diphenylamine based sample. Both materials had the same glass transition temperature (Tg), molecular weight profile, and branching characteristics as measured by both RPA and solution Brookfield viscosity. Surprisingly, the alkylated diphenylamine was able to provide the same level of molecular weight regulation and macrostructural control as the styrenated amine without refinement or optimization.

TABLE 5

Finished sample data from continuous polymerization

| Amine type | WS29 (styrenated) | Good-Rite (alkylated) | Good-Rite (alkylated) |
|---|---|---|---|
| Mooney viscosity | 43 | 36 | 43 |
| Tg, onset | −107.5° C. | −107.8° C. | −108.5° C. |
| Mw | 416,700 | 329,900 | 367,300 |
| Mw/Mn | 2.687 | 2.665 | 2.709 |
| Brookfield Viscosity | 2400 cP | 1660 cP | 2890 cP |
| Beta value | 0.096 | 0.100 | 0.109 |

EXAMPLES 42–44

The following examples serve to further demonstrate the unexpected finding that alkylated diphenylamines act as a general class of compounds effective at regulating molecular weight and polymer macrostructure in the continuous polymerization of 1,3-butadiene with a nickel based catalyst system.

Following the procedure outlined in Examples 39–41 for a continuous polymerization both Good-Rite® 3190 alkylated diphenylamine as well as Irganox®-5057 alkylated amine were compared to the styrenated control. Again through the use of two 2 gallon (7.57 liter) reactors in series, as shown in Table 6, both alkylated diphenylamines exhibit the desired molecular weight regulation and macrostructural control when used in place of a styrenated diphenylamine.

TABLE 6

Finished sample data from continuous polymerization

| Amine type | WS29 (styrenated) | Good-Rite (alkylated) | Irganox (alkylated) |
|---|---|---|---|
| Mooney viscosity | 38.7 | 34.9 | 36.4 |
| T80 | 0.07 | 0.07 | 0.06 |
| Mw | 356,300 | 365,100 | 356,500 |
| Mw/Mn | 2.10 | 2.13 | 2.13 |
| Brookfield Viscosity | 2193 | 1340 | 1747 |
| Beta value | 0.114 | 0.104 | 0.109 |

EXAMPLES 45–46

The following examples further serve to demonstrate the unexpected finding that alkylated diphenylamines provide the necessary molecular weight and macrostructural control necessary for improved cold flow, compound properties, and processing characteristics.

A continuous polymerization was conducted as described in Examples 39–41 to prepare a Wingstay® 29 styrenated amine control and a Good-Rite® 3190 alkylated diphenylamine experimental material to be used for full compounding studies in representative tire formulations. As shown in Table 7 characterization showed that the two samples had the same Mooney viscosities, glass transition temperature (Tg), and molecular weight profile regardless of the amine modifier.

TABLE 7

Finished sample data from continuous run

| Amine type | WS29 (styrenated) | Good-Rite (alkylated) |
|---|---|---|
| Sample ID | Example 45 | Example 46 |
| Mooney | 41 | 41 |
| Tg, onset | −107° C. | −107° C. |
| Mw | 327,200 | 336,800 |
| Mw/Mn | 2.644 | 2.648 |

Polymer Characterization: Raw and Compounded

The two amine modified cis-1,4-polybutadiene rubbers prepared above (Example 45–46) were compared to commercial Budene®1208 and Budene® 1280 cis-1,4-polybutadiene rubber in raw polymer characterization as well as processing and compound properties. Commercial Budene® 1280 cis-1,4-polybutadiene rubber was included in the comparison to serve as an external control for the desired degree of branching and molecular weight obtained from a styrenated amine modified system. Commercial Budene® 1208 cis-1,4-polybutadiene rubber was included as a negative control due to its lower level of branching and lower level of processability as compared to Budene® 1280 cis-1,4-polybutadiene.

For raw unfilled polymers, differences in branching manifests itself as measurable differences in Brookfield viscosity, T80 times, amount of cold flow, RPA beta values, and the polymer's hydrodynamic volume in solution. For compounded rubber, the degree of processability can be assessed through indicators such as Mill Band and Smooth Time, Garvey Die Extrudate and Spider Mold flow testing.

Raw Polymer

Characterization of the comparative raw polymers, with a focus on macrostructure, is shown in Table 8. Initially, Mooney viscosity was measured to ensure each polymer was within the specification range of commercial Budene® 1280 cis-1,4-polybutadiene rubber (35–45 $ML_{1+4}$). As expected commercial Budene® 1208 cis-1,4-polybutadiene rubber had slightly higher Mooney viscosity than the other four samples. More importantly this material had the shortest T80 time. T80 is a relaxation measurement extracted from the Mooney experiment that relates to the amount of branching or entanglement in a polymer sample. Materials with higher levels of branching relax slower (longer T80 times) than samples with little branching due to the reduced mobility of the polymer chains in the branched samples. Many effects can dominate T80 values such as gel fraction, molecular weight distribution and chain length. Typically in the same class of polymerization the higher the Mooney the longer the T80 value. This trend is reversed for the case of Budene® 1208 cis-1,4-polybutadiene rubber and Budene® 1280 cis-1,4-polybutadiene rubber. The Budene® 1208 cis-1,4-polybutadiene rubber with a higher Mooney viscosity actually has a significantly faster T80 (0.05 min) than the Budene® 1280 cis-1,4-polybutadiene rubber having a lower Mooney viscosity (0.14 min). This is in indication that the Budene® 1280 cis-1,4-polybutadiene resists relaxation due to increased branching. Likewise, the two experimental samples have the same Mooney (40) with a T80 value of 0.09 minutes. Although this T80 is slightly faster than commercial Budene® 1280 cis-1,4-polybutadiene rubber it is slower than commercial Budene® 1208 cis-1,4-polybutadiene rubber indicating that the alkylated diphenyl amine had the same effect on T80 as did the styrenated diphenyl amine in the continuous polymerization.

(dominated mostly by differences in chain mobility at low frequency for linear materials resulting in steep slopes). For Budene® 1208 cis-1,4-polybutadiene this value was 0.168 while the Budene® 1280 cis-1,4-polybutadiene rubber was

TABLE 8

Raw polymer characterization Mooney, Branching, and Microstructure

| Polymer | Description | Mooney ML1 + 4 (100° C.) | T80 (min) | Viscosity/Branching Indicators Brookfield (cP) | Cold Flow (mg/min) | Beta | DSC Onset Tg | Midpt Tg |
|---|---|---|---|---|---|---|---|---|
| 1208 | No amine | 47 | 0.05 | 6770 | 1.48 | 0.168 | −107.99 | −105.69 |
| 1280 | WS29 (styrenated) | 43 | 0.14 | 1580 | 0.36 | 0.091 | −107.71 | −105.15 |
| Example 45 | WS29 (styrenated) | 40 | 0.09 | 2110 | 0.70 | 0.113 | −106.76 | −104.45 |
| Example 46 | Good-Rite (alkylated) | 40 | 0.09 | 2360 | 0.58 | 0.116 | −106.56 | −104.57 |

Another sensitive measure of branching is Brookfield viscosity. At roughly equal Mooney viscosity cis-1,4-polybutadiene rubber made with Ni/HF catalyst systems should display the same solution viscosity as measured on 10 weight percent solutions in toluene. However, commercial Budene® 1208 cis-1,4-polybutadiene rubber solutions are significantly more viscous (6770 cP) than solutions of Budene® 1280 cis-1,4-polybutadiene (1580 cP). This difference is again related to the amount of branching found in Budene® 1280 cis-1,4-polybutadiene rubber. The more branched the material the less the chains extend in solution resulting in lower overall solution viscosity than predicted by molecular weight. This phenomenon is also seen in the two experimental samples 45 and 46 having much lower Brookfield viscosity (2110 cP and 2360 cP respectively) than the commercial Budene® 1208 cis-1,4-polybutadiene rubber that was employed as a control.

Differences in branching between similar elastomers can also be noted in the rate of cold flow that the uncured bulk rubbers display. Cold flow, as a measure of low strain deformation, is most pronounced in linear polymers having a low Mooney viscosity. Typically, the higher the Mooney viscosity the lower the cold flow due to differences in long chain entanglements. However, in the case of the Budene® 1208 cis-1,4-polybutadiene rubber, with the slightly higher Mooney viscosity, cold flow (1.48 mg/min) is actually significantly higher than Budene® 1280 cis-1,4-polybutadiene rubber having a lower Mooney viscosity (0.36 mg/min). As with T80 values, this difference is related to reduced chain mobility caused by the presence of polymer branching. The same effect is seen in the experimental polymers made continuously. At lower Mooney viscosities than the Budene® 1208 cis-1,4-polybutadiene the experimental samples all had significantly less cold flow regardless of the amine modifier type. Within the set of experimental samples, the Good-Rite® alkylated amine based material actually experience less cold flow (0.58 mg/min) than the Wingstay® 29 styrenated amine control (0.70 mg/min).

As a final measure of branching, the RPA Beta values for the five samples were compared. Beta values are extracted from an RPA frequency sweep measuring the change in Tan Delta as a function of frequency. The slope of this relationship provides the Beta value, which correlates to branching. The smaller the value the more branching and vise versa 0.091. Both Example 45 and 46 had similar Betas of 0.113–0.116. The identical Beta values measured for the experimental samples reinforces the concept that alkylated diphenylamines are equally effective as styrenated diphenylamines at regulating the macrostructure in a cis-1,4-polybutadiene made with a nickel based catalyst system.

To ensure the above analysis was not skewed by differences in molecular weight profiles the four comparative materials were subjected to size exclusion chromatography as shown in Table 9. Examples 45 and 46, regardless of amine type, had identical molecular weights, molecular weight distributions, and hydrodynamic volumes (Rw). Differences in hydrodynamic volume at equal molecular weight can be used to compare the level of branching present in a polymer. The more branched the polymer, the smaller the size the random polymer coil is in solution as measured by light scattering. Linear Budene® 1208 cis-1,4-polybutadiene rubber for example, has a larger measured radius of gyration in solution (38.7 nm) while branched Budene® 1280 cis-1,4-polybutadiene rubber and the experimental samples all have smaller radii (33.9–34.8).

TABLE 9

Raw polymer characterization Molecular Weight

| Polymer | Discription | SEC double C column set Mn (K) | Mw (K) | Mz (K) | Mw/ Mn | Mz/ Mn | Rw (nm) |
|---|---|---|---|---|---|---|---|
| 1208 | No amine | 219.5 | 443.7 | 1048 | 2.02 | 4.77 | 38.7 |
| 1280 | WS29 (styrenated) | 158.5 | 393.6 | 1037 | 2.48 | 6.14 | 33.9 |
| Example 45 | WS29 (styrenated) | 189.6 | 410.1 | 1265 | 2.16 | 6.67 | 34.8 |
| Example 46 | Good-Rite (alkylated) | 191.1 | 413.6 | 1205 | 2.16 | 6.31 | 34.2 |

Compound Properties

The final part of this study focused on comparing the compounded physical properties of the two experimental polymers 45 and 46 to the control Budene® 1280 cis-1,4-polybutadiene rubber and Budene® 1208 cis-1,4-polybutadiene rubber. The compound recipe, mixing and testing protocols followed ASTM method D 3189–99 for evaluation of solution polybutadiene rubber. Testing focused on three aspects, vulcanizate properties, stress/strain properties, and processing characteristics with data shown in Table 10.

All the samples tested had nearly identical vulcanizate properties. Cure kinetics as measured as the time to 90% cure (tc 90) for the amine regulated polymers were all within 0.5 minutes of each other. Scorch is also another important aspect of cure kinetics that is measured as ts 1. In this study again all the amine regulated polymers had nearly identical ts 1 values regardless of the amine type.

Stress/strain properties for both experimental samples 45 and 46 were also very similar. The values for tensile, elongation, modulus, and hardness were nearly identical for these two polymers.

TABLE 10

Compound property comparison

| Ingredients | | | | |
|---|---|---|---|---|
| Budene 1208 | 100 | 0 | 0 | 0 |
| Example 45 WS29 (styrenated) | 0 | 100 | 0 | 0 |
| Example 46 Good-Rite (alkyalated) | 0 | 0 | 100 | 0 |
| Budene 1280 | 0 | 0 | 0 | 100 |
| CARBON BLACK | 60 | 60 | 60 | 60 |
| Sub Circoline 4240 | 15 | 15 | 15 | 15 |
| STEARIC ACID | 2 | 2 | 2 | 2 |
| ZINC OXIDE | 3 | 3 | 3 | 3 |
| NON-PRODUCTIVE | 180 | 180 | 180 | 180 |
| NON-PRODUCTIVE | 180 | 180 | 180 | 180 |
| SANTOCURE NS TBBS ACCELERATOR | 0.9 | 0.9 | 0.9 | 0.9 |
| SULFUR | 1.5 | 1.5 | 1.5 | 1.5 |
| PRODUCTIVE | 182.4 | 182.4 | 182.4 | 182.4 |

| | Budene 1208 | Example 45 | Example 46 | Budene 1280 |
|---|---|---|---|---|
| Rheometer - ODR #1 | | | | |
| tc 50 | 9.65 | 10.55 | 11.1 | 10.7 |
| tc 90 | 13.55 | 14.15 | 14.65 | 14.25 |
| ts 1 | 1.3 | 4.5 | 4.15 | 4.6 |
| Max Torque (MH) | 36.8 | 31 | 25.6 | 31.4 |
| Min Torque (ML) | 6.5 | 8 | 5.8 | 8.9 |
| Tensile & Elongation - Original | | | | |
| Tensile @ break, psi | 2389 | 2287 | 2468 | 2400 |
| Elongation @ break, % | 372 | 437 | 426 | 407 |
| 100% Modulus, psi | 299 | 268 | 269 | 279 |
| 300% Modulus, psi | 1726 | 1304 | 1512 | 1480 |
| 500% Modulus, psi | | | | |
| Shore A Hardness | 60.9 | 57.9 | 58.3 | 57.8 |

Processing Characteristics

Process characterization was conducted by subjecting the compounds mixed above to both Garvey Die and Spider Mold tests (Table 11). It was expected that the linear Budene® 1208 cis-1,4-polybutadiene rubber would perform poorly in these tests while the branched Budene® 1280 cis-1,4-polybutadiene rubber type samples, including Examples 45 and 46, would excel. As shown in Table 11 this was indeed the case. For Garvey Die, Budene® 1208 cis-1,4-polybutadiene rubber managed to extrude just 86 inches of material weighing 189 grams, commercial Budene® 1280 cis-1,4-polybutadiene rubber on the other hand achieved 93 inches and 207 grams. The two experimental rubber samples, regardless of amine type, both extruded nearly 220 grams and over 100 inches. Similarly, Budene® 1208 cis-1,4-polybutadiene rubber performed very poorly in the Spider Mold test barely filling the short arm and not filling the lower bar at all. Conversely, all three amine regulated materials provided similar results with very good fill rates of 80% for even the lower bar. These results indicate that the flow characteristics of the polybutadiene produced with the alkylated diphenylamine modifier was the same as the polymer produced with styrenated diphenylamine modifier.

TABLE 11

Processing indicators

| | Budene 1208 | Example 45 | Example 46 | Budene 1280 |
|---|---|---|---|---|
| Garvey Die | | | | |
| grams | 189.2 | 219.4 | 218.6 | 207.3 |
| inches | 86 | 102 | 99.5 | 93 |
| grams/inch | 2.2 | 2.2 | 2.2 | 2.2 |
| Spider Mold | | | | |
| Length - long arm | 0.94 | 2.88 | 2.94 | 2.38 |
| Length - short arm | 0.5 | 1.19 | 1.38 | 1.32 |
| Weight (grams) | 7.8 | 14.52 | 14.61 | 14.13 |
| Lower Bar % Fill | 0 | 80 | 85 | 80 |

One of the more important tests used to predict processing characteristics of a polymer is a mill test. This test predicts time to banding and time to smoothing of a predetermined polybutadiene recipe on a rubber mill. The recipe and test results are shown below in Table 12 for the four comparative samples. As expected, the Budene® 1208 cis-1,4-polybutadiene rubber performed poorly in mill banding and smoothing when compared to the Budene® 1280 cis-1,4-polybutadiene rubber. The experimental rubber samples 45 and 46 produced similar results indicative of a branched material. Example 46 prepared from the alkylated diphenylamine exhibited excellent banding and smoothing times.

TABLE 12

Mill processing characteristics.

| | | | | |
|---|---|---|---|---|
| Budene1280 | 90 | 0 | 0 | 0 |
| Budene1208 | 0 | 90 | 0 | 0 |
| Example 45 WS29 (styrenated) | 0 | 0 | 90 | 0 |
| Example 46 Good-Rite (alkyalated) | 0 | 0 | 0 | 90 |
| NATURAL RUBBER | 10 | 10 | 10 | 10 |
| ZINC OXIDE | 3 | 3 | 3 | 3 |
| Agerite Resin D | 1.5 | 1.5 | 1.5 | 1.5 |
| CARBON BLACK | 69 | 69 | 69 | 69 |
| Gerstine Extending Oil | 12 | 12 | 12 | 12 |
| PRODUCTIVE | 185.5 | 185.5 | 185.5 | 185.5 |

| | Budene 1280 | Budene 1208 | Example 45 | Example 46 |
|---|---|---|---|---|
| Test Method E-886, Rev. 1 (Laboratory Polybutadiene Processability Test) | | | | |
| Time to Banding | 10 | Did Not Band | 9 | 5 |
| Time to Smoothing | 33 | Did Not Smooth | 60 | 28 |

While certain representative embodiments and details have been shown for the purpose of illustrating the subject invention, it will be apparent to those skilled in this art that various changes and modifications can be made therein without departing from the scope of the subject invention.

What is claimed is:

1. A process for producing cis-1,4-polybutadiene having a reduced molecular weight and improved processability which comprises polymerizing 1,3-butadiene in the presence of (a) an organonickel compound, (b) an organoaluminum compound, (c) a fluorine containing compound, and (d) an alkylated diphenylamine; wherein the alkylated diphenylamine has alkyl groups that contain from 2 to 18 carbon atoms, wherein the organoaluminum compound and the fluorine containing compound are brought together in the presence of the alkylated diphenylamine, wherein said 1,3-butadiene monomer is polymerized to produce the high cis-1,4-polybutadiene by solution polymerization in a polymerization medium which includes an organic solvent.

2. A process as specified in claim 1 wherein the organoaluminum compound is a trialkylaluminum compound, wherein the organonickel compound is a nickel salt of a carboxylic acid, wherein the fluorine compound is hydrogen fluoride or a hydrogen fluoride complex, and wherein the alkylated diphenylamine is a para-alkylated diphenylamine.

3. A process as specified in claim 2 wherein from about 0.25 phm to about 1.5 phm of the alkylated diphenylamine is present.

4. A process as specified in claim 3 wherein said process is conducted at a temperature which is within the range of about −10° C. to about 120° C., and wherein the para-alkylated diphenylamine has alkyl groups that contain from 4 to 12 carbon atoms.

5. A process as specified in claim 4 wherein said process is conducted on a batch basis.

6. A process as specified in claim 4 wherein the molar ratio of the organoaluminum compound to the organonickel compound is within the range of from about 0.3:1 to about 300:1, wherein the molar ratio of the fluorine containing compound to the organonickel compound is within the range of about 0.5:1 to about 200:1, and wherein the molar ratio of the fluorine containing compound to the organoaluminum compound is within the range of about 0.4:1 to about 10:1.

7. A process as specified in claim 6 wherein said process in conducted at a temperature which is within the range of about 30° C. to about 110° C. wherein said process is conducted on a continuous basis.

8. A process as specified in claim 7 wherein from about 0.5 phm to about 0.75 phm of the alkylated diphenylamine is present.

9. A process as specified in claim 8 wherein the polymerization medium contains from about 5 to about 35 weight percent monomers.

10. A process as specified in claim 9 wherein the molar ratio of the organoaluminum compound to the organonickel compound is within the range of about 3:1 to about 100:1, and wherein the molar ratio of the fluorine containing compound to the organoaluminum compound is within the range of about 0.7:1 to about 7:1.

11. A process as specified in claim 10 wherein the polymerization medium contains from about 10 to about 30 weight percent monomers.

12. A process as specified in claim 11 wherein the molar ratio of the fluorine containing compound to the organoaluminum compound is within the range of 1.5:1 to 2:1.

13. A process as specified in claim 11 wherein said process is conducted at a temperature which is within the range of about 70° C. to about 95° C.

14. A process as specified in claim 11 wherein said process is carried out until a polymer yield in excess of 90% is attained.

15. A process as specified in claim 11 wherein the polymerization medium contains from about 20 to about 25 weight percent monomers.

16. A process as specified in claim 1 wherein the polymerization medium is free of aromatic solvents.

17. A process as specified in claim 1 wherein the organoaluminum compound is selected from the group consisting of triethyl aluminum, tri-n-propyl aluminum, triisobutyl aluminum, trihexyl aluminum, diethyl aluminum hydride, di-n-propyl aluminum hydride, di-n-butyl aluminum hydride, and diisobutyl aluminum hydride; and wherein the organonickel compound is selected from the group consisting of nickel naphthenate, nickel octanoate, and nickel neodecanoate.

18. A process as specified in claim 17 wherein the fluorine containing compound is a hydrogen fluoride complex.

19. A process as specified in claim 1 wherein the fluorine containing compound is complexed with the alkylated diphenylamine.

* * * * *